United States Patent [19]

Toutountzis

[11] Patent Number: 5,417,017

[45] Date of Patent: May 23, 1995

[54] TERMITE CONTROL

[75] Inventor: Vasilios Toutountzis, Sorrento, Australia

[73] Assignee: Termi-Mesh Aust. Pty. Ltd., Australia

[21] Appl. No.: 40,305

[22] Filed: Mar. 30, 1993

Related U.S. Application Data

[63] Continuation-in-part of Ser. No. 575,908, Aug. 31, 1990, abandoned, and Ser. No. 825,299, Jan. 23, 1992, abandoned.

[30] Foreign Application Priority Data

Feb. 25, 1993 [AU] Australia .................. PL7520

[51] Int. Cl.6 .................. A01M 1/00; E04B 1/72
[52] U.S. Cl. .................. 52/101; 52/250; 52/292; 52/515; 52/728; 174/107; 245/8
[58] Field of Search .................. 52/101, 169.14, 250, 52/292, 515, 517, 727, 728; 428/256, 907, 351; 43/118, 119, 132.1; 174/107; 245/8

[56] References Cited

U.S. PATENT DOCUMENTS

| | | | |
|---|---|---|---|
| 356,374 | 1/1887 | Parks | 43/119 |
| 985,681 | 2/1911 | Konopinski | 52/728 X |
| 1,201,756 | 10/1916 | Perry | 428/256 X |
| 2,017,106 | 10/1935 | Sandell | 428/256 X |
| 2,242,266 | 5/1941 | Scales | 52/101 |
| 2,425,235 | 8/1947 | Ferrante | 428/907 X |
| 2,533,439 | 12/1950 | Elder | 428/256 X |
| 2,899,771 | 8/1959 | Burris | 428/907 X |
| 4,547,626 | 10/1985 | Pedersen et al. | 174/107 |
| 4,678,699 | 7/1987 | Kritchevsky et al. | 428/256 X |
| 4,823,520 | 4/1989 | Ebeling et al. | 52/101 |

OTHER PUBLICATIONS

"Preventing Damage to Buildings by Subterranean Termites and Their Control", Farmers Bulletin No. 1911 U.S. Dept. of Agriculture Nov. 1942.

Primary Examiner—Carl D. Friedman
Assistant Examiner—Robert Canfield
Attorney, Agent, or Firm—Kinney & Lange

[57] ABSTRACT

A barrier to termites particularly suitable for protecting buildings comprising a mesh made of a material that is resistant to breakdown in the environment of use and is resistant to secretions deposited by termites, such as stainless steel, and is also sufficiently hard to not be attacked by termites, such as having a hardness not less than about Shore D70. The pores of the mesh being dimensioned so the maximum linear dimension in any direction of the pores is less than the maximum linear dimension of the cross-section of the head of the species of termite to be controlled.

20 Claims, 8 Drawing Sheets

TERMITE CONTROL

This is a Continuation-In-Part application of U.S. Ser. Nos. 07/575,908, filed Aug. 31, 1990, now abandoned, and 07/825,299, filed Jan. 23, 1992, now abandoned.

BACKGROUND OF THE INVENTION

This invention relates to the control of termites in relation to buildings and other structures and in particular to achieving such control without the use of harmful chemicals.

The most popular procedure for providing a barrier to the access of termites to buildings or other structures supported in or on the ground is to saturate the ground beneath or around the structure with appropriate chemicals, to kill any existing termites, and to provide a residue of the chemical within the ground which will remain effective for many year against the passage of termites therethrough to the structure. It has been proposed in published patent specifications to provide a mat of fibrous or absorbent material to be laid below the foundations of a building with the fibre or porous material saturated with, or containing an appropriate chemical which will kill termites that attempt to pass therethrough. Refer to published Australian Patent Application Nos. 85176/82, 11 412/83, 16980/83 and 21934/84.

These methods of termite control have the major disadvantage as the chemicals are usually of a composition that is considered highly dangerous to humans and thus constitute a hazard to the people applying the chemicals and to other people in the vicinity. Under some atmospheric conditions, the chemical can be carded considerable distances from the area where they are being applied. Thus people unaware of the presence of the chemicals, and thus not alerted to take protective action, may also be exposed to the potential danger of the chemicals used to control termites. The danger continues to exist after the initial application of the chemical so long as the chemical remains effective against the termites.

Also, as it is necessary to establish a high concentration of the chemical in the ground beneath where the building is to be built in order to obtain the required period of protection against termite entry to the building, leaching of the chemical will occur over time. This leaching will naturally reduce the effectiveness of the chemical as a barrier to the termites. As the chemical in many instances is initially placed beneath a concrete slab upon which the building is erected, it is very difficult to apply further chemical to replace that removed by the leaching and so maintain an effective barrier.

Even more important, chemicals leached from the ground beneath the building is carried by the leaching water into other areas where it may be hazardous to humans, animals or crops. Also the leached chemical can enter dyers, streams or lakes or underground water catchments which can potentially spread the chemicals over a very wide area thus increasing the potential exposure to the chemical. It will also be appreciated that the chemicals leached from building sites over a relatively wide area can collect in a single river, stream or other catchment, thus resulting in an accumulation of chemicals that break down very slowly.

Many buildings, particularly homes, are built on a slab of concrete and although termites can normally not penetrate concrete, cracks frequently develop in the concrete thus permitting the passage of termites therethrough into the building. Even when the cracks are of a fine nature, they do provide the facility for the termites to burrow through the concrete by secreting materials which will break down the concrete along the fine cracks and thus permit the termites to burrow therethrough.

Also, in buildings erected on a concrete slab, it is common practice to provide pipes or conduits that extend through the concrete slab, such as water and waste pipes. As the concrete is cast in situ about these pipes or conduits, a small opening often develops about the pipe or conduit due to shrinkage of the concrete during curing.

These openings also provide access for termites through the concrete into the building structure. Thus even where a building is erected on a concrete slab, the ground beneath the slab must be treated with substantial quantities of chemicals to prevent access by termites to these openings.

It has also been known to use sheet metal as a barrier to termites such as galvanized steel plates on the top of stumps that support a building. Although this may be effective and commercially viable in relation to a building supported on stumps, it is expensive and has installation problems when considered in respect to a building supported on a concrete slab. Sheet metal is difficult to joint on-site in a manner to exclude passage of termites through the joint. Also, if the metal sheet is sufficiently strong to prevent accidental puncture by workman traffic on-site, it is then difficult to bend and shape to the required contours to fit with the building structure in a manner to provide an effective termite barrier. It would also be difficult to achieve an effective seal around pipes or conduits that must pass through the sheet.

Sheet metal, including stainless steel, as proposed in French Patent Application No. 79 04240 (Publication No. 2453952) is used to provide a barrier to termites travelling up a wall to enter a building in a manner analogous to a metal plate on a building stump. However, that sheet is preformed for a specific installation and is not appropriate for on-site construction to a range of shapes and configuration with the ability to maintain the integrity of a barrier against the passage of termites.

In addition to buildings, termites attack a wide range of structures and equipment including wooden poles and other wooden structures, underground cables and conduits made of a range of materials that will be attractive to termites. The only effective protection for such structures are chemical treatment or solid metal barriers that are resistant to termite attack.

It is therefore the object of the present invention to provide a barrier that will inhibit the passage of termites such as into a building or structure, the barrier being both effective and avoids the use of chemicals that are harmful to humans and/or the environment.

With this object in view there is provided by the present invention an improved termite barrier which is substantially resistant to termite chewing and corrosion, the termite barrier comprising a mesh sheet formed of a material resistant to breakdown in the environment of use and substantially resistant to termite secretions, said material having a hardness of not less than about Shore D70 for resistance to termite chewing, the pores of the mesh having a linear dimension in any direction less than the maximum linear dimension of the cross section of the head of the species of termite to be controlled.

Conveniently the pores of the mesh having a linear dimension in at least one direction, less than the minimum lineal dimension of the cross section of the head of the species of termite to be controlled. Preferably, the pores in the mesh am polygonal with a maximum diagonal dimension less than the maximum linear dimension of the cross section of the head of the species of termite to be controlled.

Termites of the species which attack wood, timber or the like are characterised by having a head formed of a hard substantially nondeformable structure. The body of these termites is a relatively soft and weak material. Also these termites have a head which is of substantially larger cross sectional dimensions than any other part of the termites body. Accordingly the head cross sectional size determines the ability of the termite to pass through an opening or passageway such as may exist in any form of termite barrier.

It is also known that termites secrete a liquid saliva or material which is capable of breaking down the physical structure of many materials into at least particles of a size that can be transported by the termites so as to facilitate the formation of a passage for the termites to pass through. The secreted material includes, amongst other components, acids such as formic acid.

The mesh sheet can be laminated with a flexible plastic sheet or sandwiched between two separate sheets.

Alternatively the mesh may be embedded in one plastic sheet, preferably with both sides of the mesh sheet covered by the plastic material. The combining of the mesh sheet and the plastic provide protection of the mesh sheet against damage that may cause displacement of the strands forming the mesh, with resultant enlargement of the openings or pores of the mesh in a specific area thereof to a size to permit the passage of the termites therethrough.

It is also to be appreciated that it is normal practice to provide a sheet of plastic material beneath the concrete slab upon which a building is to be erected to provide a barrier against the entry of moisture through the concrete into the building. Accordingly, by incorporating the mesh sheet with or into a plastic sheet, the resulting assembly can perform the two functions of providing a moisture and a termite barrier.

In practical application of the termite material a continuous layer thereof is positioned beneath an underside of the slab extending to a perimeter of the slab in all directions and upwardly about the perimeter of the slab to a distance above the slab and above the ground level adjacent thereto.

Another application is in a building structure erected on a ground level or near ground level concrete slab, and having a non integral termite resistant adjacent structure and a strip of the termite barrier material arranged with the respective marginal edge portions along the opposite longitudinal edges of the strip integrally secured to the slab and the adjacent structure to establish integrity of the connection between the slab and the adjacent structure against the passage of termites.

Preferably the mesh is woven from fine stainless steel wire or filaments of the appropriate material, such as stainless steel, that is resistant to corrosion by most materials that the mesh will be in contact with or associated with during its use in the termite barrier. In particular, the stainless steel resists rust through contact with moisture, and resists tach by most acid materials, including formic acid and other constituents of the secretion released by termites. However, it is to be understood that wires, strands or filaments of other materials may be used to produce the mesh sheet provided the material has the required resistance to breakdown when exposed to the environment and materials present in the ground and to termite attack, and is sufficiently hard that the particular species of termites can not chew through the strands or filaments. Other materials may be fibres of ceramics, glass or hard plastics.

It is known that the physical dimensions of termites vary from species to species and that in different areas of the world, different species of termites are predominant. Accordingly, the actual size of the pores of the mesh will be determined by the particular or range of termites to be controlled in the particular area where the mesh is to be used.

Figure 1:
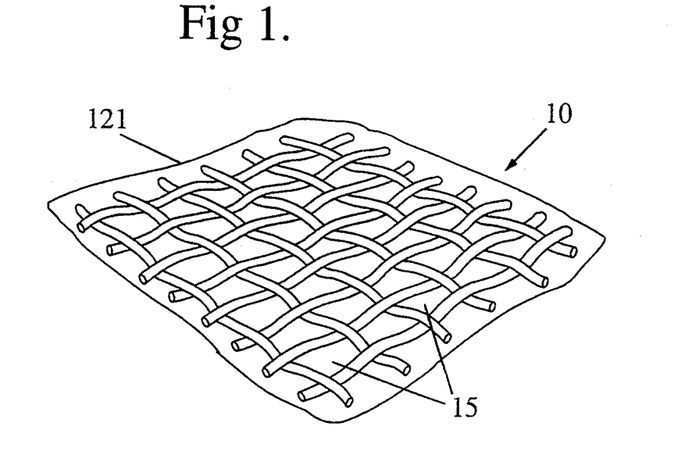
FIG. 1 is a perspective view of a section of mesh as proposed to be used as a termite barrier.
Figure 2A:
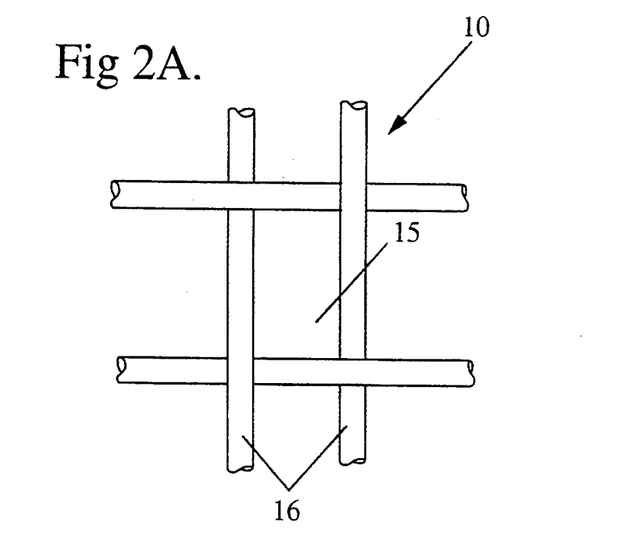
FIG. 2a is an enlarged view of a portion of the mesh shown in FIG. 1.
Figure 2B:
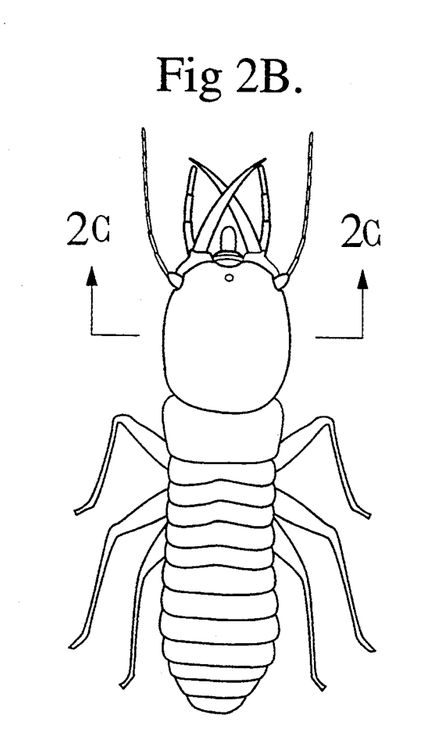
FIG. 2b is an enlarged view from above of a typical termite

In the area around Perth, Western Australia, the most common and dangerous termites are of the Coptotermes family which have a head of a generally circular cross sectional somewhat flattened, as shown in FIG. 2B shape with a maximum linear dimension of between 1 to 1.5 mm. It is thus suitable to use in that area a mesh having pores or openings having a maximum dimension in any direction of not more than 0.85 mm, and preferably not more than 0.6 mm. For convenience in manufacture, the pores will normally be of a generally rectangular shape with the length of the sides 0.4 and 0.7 mm respectively.

The wire of filament may be of any convenient commercial size and typically may be in the range of 0.1 to 0.2 mm in diameter. The wire of filament may be of cross-section is preferred and more readily commercially available in the manufacture of mesh. The mesh may also be produced by stamping or punching holes of the required shape in sheet or film of metal or other suitable material of an appropriate thickness.

In most species of termites there are worker termites and soldier termites, the latter having larger heads than the worker termites in some species, but not all. It is thought to be normal for the soldier termites to lead or at least travel with the workers. Thus it is believed that if the mesh has pores of a size to prevent the passage of the soldier termites, this would be effective in inhibit the worker termites from passing alone through the mesh. The workers are the ones that cause the damage and must be stopped by the mesh.

The plastic material forming the sheet with which the mesh sheet can be laminated or embedded in, is conveniently PVC, but may be of any other suitable plastic which will provide a moisture barrier and will not deteriorate and break down when buried in the ground for the normal life expectancy of termite barriers which may be of the order of 15 to 30 years.

Conveniently, the termite barrier is produced in sheets of any convenient size and may be produced in a form of roll of a width of the order of 5 to 10 meters.

The advantages of the termite barrier as proposed above are principally that there is no harmful chemicals used in the creation of the barrier, the barrier will have an effective life commensurate with the life of the building. Further, the barrier can be conveniently transported and applied without the level of precautions required when handling pesticides or other chemicals and with a minimum of skill. Further as the barrier is in the form of a mesh, it is substantially more flexible and easily worked as by cutting, contouring and shaping, particularly in comparison with solid sheet metal.

BRIEF DESCRIPTION OF THE DRAWINGS

The invention will be more fully understood from the following description of the termite barrier as applied to buildings and other uses and as illustrated in the accompanying drawings, wherein.

DETAILED DESCRIPTION OF THE PREFERRED EMBODIMENTS

Figure 2C:
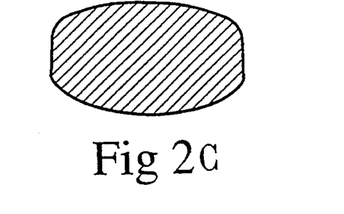
FIG. 2c is a cross sectional outline of the head of the typical termite along line 2c–2c of FIG. 2b.

Referring now to FIGS. 1 and 2a–2c of the drawings, the termite barrier is in the form of a woven mesh 10 made of corrosion resistant stainless steel wires or filaments such as 304 grade stainless steel. The termite barrier may also include a flexible moisture impervious plastic sheet 121 formed to the woven mesh 10. Preferably, both sides of the woven mesh 10 are covered by a plastic sheet 121. The woven filaments form a series of pores or openings 15 in the mesh which are of a generally rectangular shape with the distance between the two more closely spaced sides 16 of the rectangle and the diagonal thereof is less than the maximum cross sectional dimensions of the head of the species of termite in respect of which the mesh is to form a barrier (FIG. 2c).

Figures 3, 4:
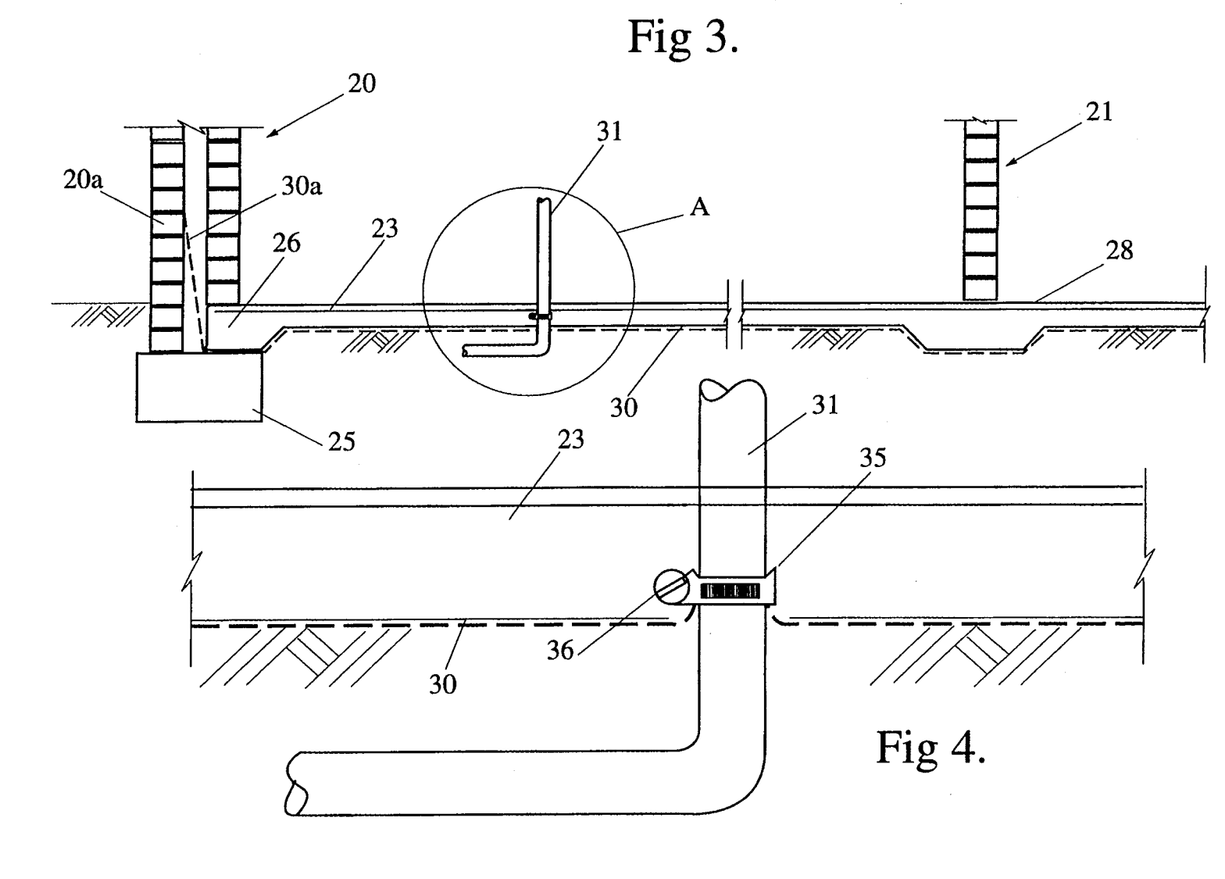
FIG. 3 is a diagrammatic sectional view through portion of a building showing the application of the termite barrier thereto.
FIG. 4 is an enlarged view of the portion A shown in FIG. 3 where a conduit passes through the termite barrier.

Referring now to FIG. 3 which shows a cross section of a portion of a building having an external double brick wall 20 and an internal single brick wall 21 in association with a poured concrete slab base 23, As is conventional in this form of construction, a continuous concrete footing 25 is formed to support the double brick wall 20. The perimeter of the concrete slab 23 has a perimetal portion 26 of increased depth also supported on the footing 25, and additional areas of increased depth are also provided beneath the internal single brick walls 21 as indicated at 28 in FIG. 3.

After the footings 25 have been poured and cured, an integral sheet of termite barrier mesh 30 is laid over the complete area where the slab 23 is to be poured with portion of the mesh overhanging beyond the footing 25 as will be referred to further hereinafter. When the mesh 30 is laid it is contoured to closely follow the contour of the ground including following the contour of any trenches or depressions in the ground, such as are required to accommodate the increased thickness areas 26 and 28 of the concrete slab. Because the termite barrier is in the form of a wire mesh, it can be readily deformed to follow these contours, and can be readily folded where there is excess material resulting from a change in the contour of the surface over which it is being laid. Where a pipe or duct such as indicated at 31 is required to pass through the slab 23, an appropriately located aperture is cut in the mesh 30 and the edge of the mesh clamped about the pipe or duct as hereinafter further described with reference to FIG. 4.

For convenience in handling, the mesh is produced in rolls of a convenient width such as 5 m, and the mesh is laid in position with the edges of adjacent strips overlapped and secured together in a multi fold lap-type joint wherein as each fold is made it is hammered or rolled flat throughout its length to provide a secure and permanent join that is termite-proof.

After the strips of mesh have been placed in position and effectively secured along the overlapping edges, and the form-work for the concrete slab 23 is in position, the slab is poured in the conventional way with conventional steel reinforcement therein and a moist barrier sheet therebeneath (not shown). After the elapse of the appropriate curing time, the commencement of the erection of the external double brick wall of the building can be undertaken. In regard to the double brick wall construction as seen in FIG. 3 at 20 the overhanging edge portion 30a of the termite barrier mesh is folded upwardly so as to lie between the respective inner and outer layers of bricks. The outer layer 20a of bricks is built up to a level of at least 10 cm conveniently between 20 to 30 cm above the surrounding ground level, then the upper edge portion 30 of the barrier mesh is bent outwardly over the bricks forming the outer layer and thereafter, the rest of the bricks of the outer and inner wall are built up in the conventional manner.

There is thus formed a complete barrier in the perimeter double brick wall which is continuous with the barrier beneath the concrete slab to prevent the entry of termites into the interior of the building.

Figure 5:
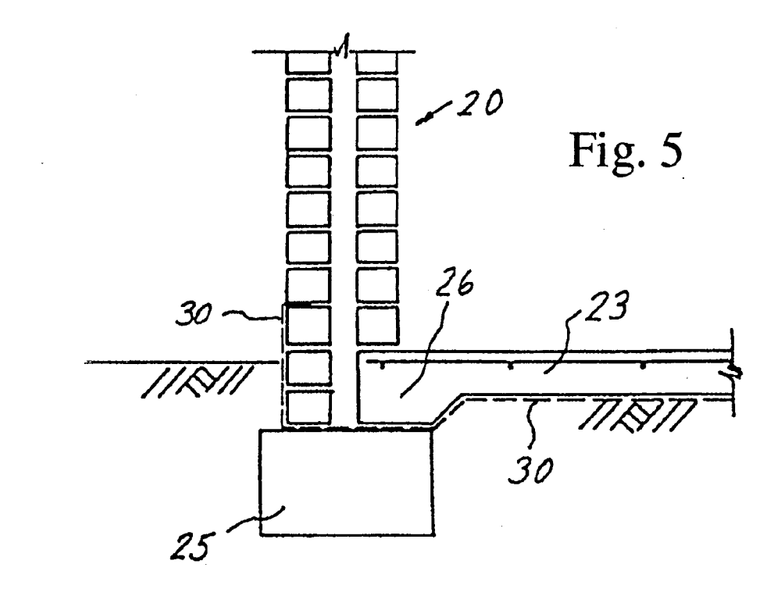
FIG. 5 is a cross sectional view of a portion of a building to which the termite barrier has been applied in an alternative form to that shown in FIG. 3.

As an alternative, as shown in FIG. 5, the barrier mesh 30 projects outwardly beneath both layers of the double brick wall and is then bent upwardly as indicated at 30° against the external face of the perimeter wall. If desired, the barrier mesh at the upper end is folded and entered between two layers of bricks at a level of 10 or more cm above the ground level. Each of the above alternative constructions may be used in other forms of external wall constructions such as a timber framed inner wall and a brick outer wall. Also the construction shown in FIG. 5 may be used with a single timber framed external wall.

Where a conduit, such as 31 in FIG. 3 previously referred to, projects through the concrete slab 23, the barrier mesh has an aperture cut therein and prior to pouring the slab of the size smaller in diameter than the duct to be passed therethrough. The mesh about the periphery of the hole so formed can then be stretched and formed into an upwardly or downwardly projecting flange 35 as seen in FIG. 4 and a clamp 36 is fitted around that flange to press it firmly into engagement with the external surface of the duct 31. The clamp 36 may conveniently be in the form of a conventional stainless steel hose clamp.

Preferably the flange 35 is formed to project upwardly from the normal level of the barrier mesh as shown in FIG. 4 so that when the slab is cast, the flange and the clamp secured about the duct will be embedded in the concrete forming the slab. It will be appreciated that a woven mesh is capable of being stretched without enlarging the holes or pores therein to a size to permit termites to pass through, The stretching is achieved by distorting the rectangular pores into a parallelogram shape thus reducing the dimensions of the pores in one direction while they are enlarged in the other direction. The reduction in one direction is sufficient to prevent the passage of termites.

Figure 6:
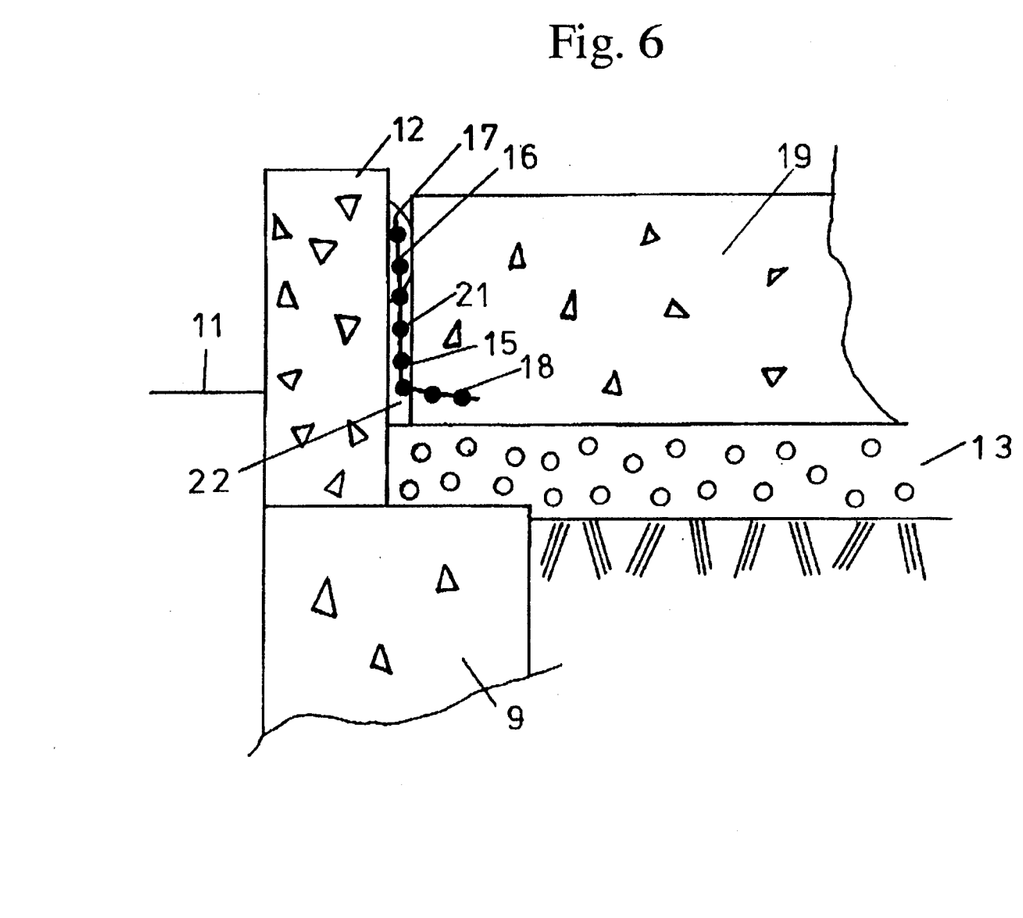
FIG. 6 is a cross-sectional view of portion of an alternative type of building construction to which the termite barrier has been applied.

Referring now to FIG. 6 of the drawings, there is shown in a simplified representation, a cross section through part of the slab and wall of a building. The footing 9 is constructed of concrete with appropriate metal reinforcement and is located some distance below the normal surface of the ground indicated at 11. The concrete beam 12 is normally precast and located on site in position on the footing 9, a series of such beams being provided to form the perimeter of the base of the building. As the beams 12 are precast and subsequently transported to the building site, it is not convenient to have barrier material embedded in the beam during the casting thereof, particularly as there is the possibility of damage to the barrier material during subsequent transportion and installation of the beams.

Following completion of the positioning of the perimeter beams 12 in place upon the footings, the area bounded by the beams is prepared for pouring of the concrete slab by the laying down and compacting of a bed of stones as indicated at 13 prior to the pouring of the full slab. Also prior to pouring of the slab, a continuous strip 15 of the termite barrier material is arranged so one marginal edge portion 16 is applied to the internal face of the beam 12 by appropriate mechanical fixings such as concrete nail and is overlayed by an adhesive cement layer as indicated at 17. After curing of the adhesive cement, the concrete floor slab 19 is poured and during such pouring the other marginal edge portion 18 of the barrier material strip 15 is embedded in the concrete slab.

The concrete of the slab may extend up to and abut the internal face of the beam 12, thereby also encasing the marginal portion 16 of the termite barrier strip that is adhered to the beam, or in alternative structures, an expansion gap, may as indicated at 22 be left between the perimeter edge of the slab 18 and the adjacent beam 12. Where such an expansion gap is left, as seen in FIG. 6, the barrier strip is provided with a re-entrant fold 21 extending the length thereof which will provide the flexibility and freedom for movement of the floor slab relative to the beam without the risk of fracture of the termite barrier strip. As shown in FIG. 6, the marginal edge portion 18 extends into the slab through the edge face thereof. However, it is to be understood that the termite barrier step may also extend into the underside of the slab with the marginal portion then turned upwardly into the under side of the slab.

It is also to be understood that the beam 12 as shown in FIG. 6 can be replaced by a case in situ or precast wall or similar upwardly extending member. In such an arrangement the barrier strip can be installed as shown in FIG. 6 or each marginal edge portion of the barrier strip 15 can be embedded in the slab and upright member respectively during casting of each or can be embedded in one and adhered or bonded to the other. In constructions where the slab and other member are cast separately, it is preferable to provide a re-entrant fold 21 extending the length of the barrier strip 15 to provide the ability for limited freedom of movement between the structural members without fracture of the barrier strip.

The above description of the installation of the termite barrier strip between a beam or wall and a slab may also be applied to providing an effective termite barrier between an existing concrete member and a newly cast member which may be functioning as an extension of an existing structure. In such circumstances, the same technique and layout as above discussed with respect to the beam and slab, may be applied to extending an existing slab.

Figure 8:
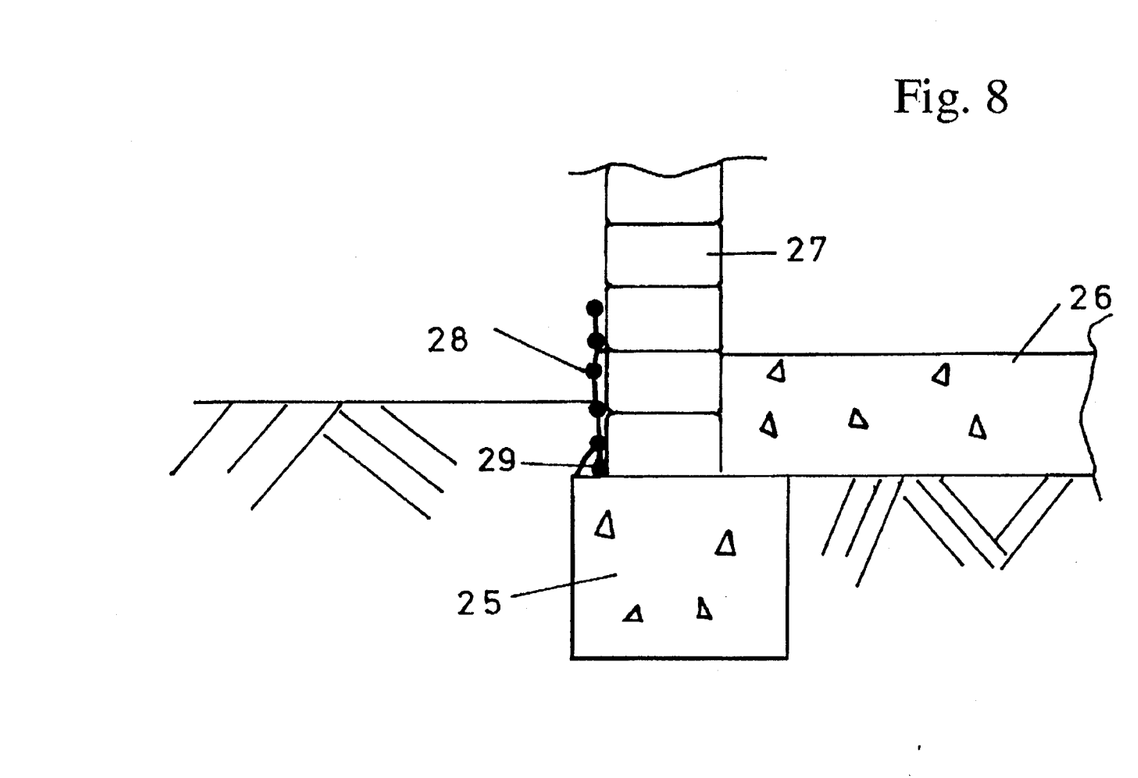
FIG. 8 is a cross sectional view of a portion of a building to which the termite barrier has been fitted after construction of the building.

Referring now to FIG. 8 of the drawings where there is illustrated a further application of the termite barrier strip along the external perimeter wall of an existing building. In this situation as illustrated, the existing building comprises a conventional footing 25, a floor slab 26 and an external wall 27, which may be in the form of a brick or poured concrete construction. In such an existing structure, there is not access to the underside of the slab 26 or the interface between the slab 26 and the wall 27 and accordingly, it is necessary to install the termite barrier strip externally. This is achieved by initially removing the earth adjacent the external wall to a depth to expose the existing concrete footing and then applying the barrier material strip 28 extending up the external face of the wall from the footing to a substantial distance above the ground level. The lower marginal edge of the termite barrier strip, which is seated on the footing 25, is secured thereto and to the lower portion of the wall by suitable adhesive cement as indicated at 29. The upper marginal portion of the termite barrier strip may be anchored to the wall by concrete nails of the like at suitable intervals along the length, or may also be secured thereto by the use of adhesive cement or both. In this regard, it is to be noted that in view of the inability of the termites to survive when exposed to ambient conditions, it is only necessary for the termite barrier strip 15 to extend approximately 20 to 30 centimeters above normal ground level to effectively prevent termites entering the building or to cause them to build external galleries that are readily visible and hence detectable.

Figure 7:
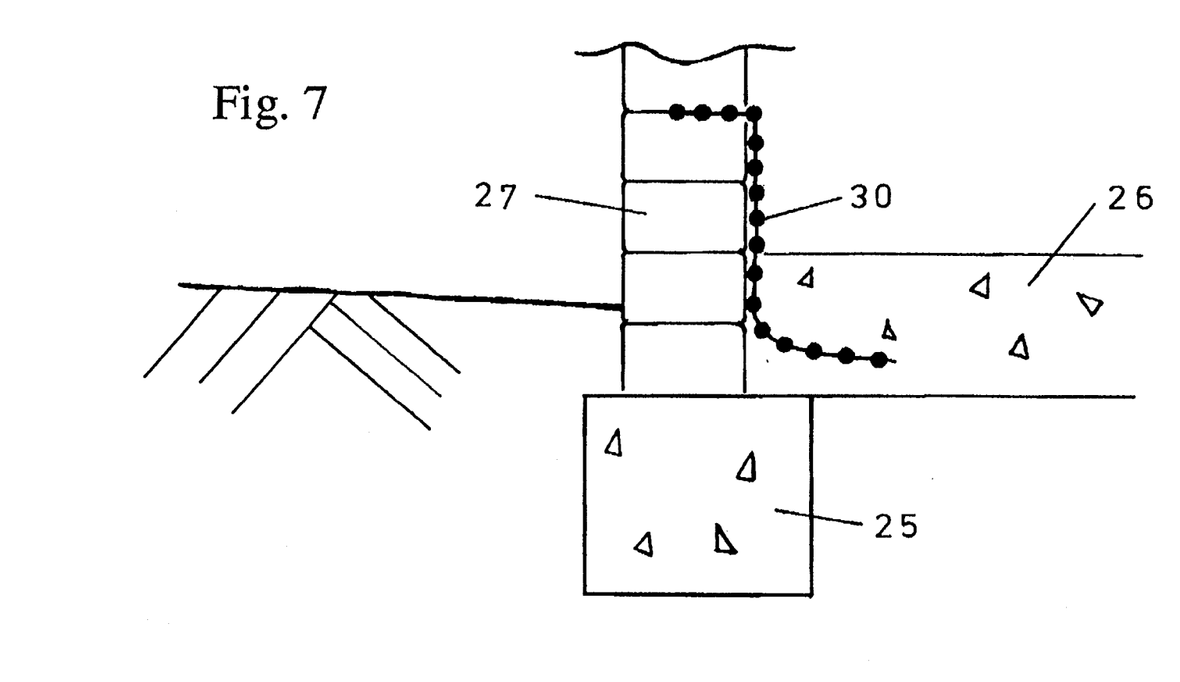
FIG. 7 is a cross sectional view of portion of a further alternative type of building construction to which the termite barrier has been applied.

There is shown in FIG. 7 a modification of the construction shown in FIG. 8 which is suitable for use during the construction of the building as compared with that shown in FIG. 7 which is more appropriate for application to existing buildings. In FIG. 7, the conventional footing 25, floor slab 26 and external wall structure 27 are the same as that previously described with respect to FIG. 8. The termite barrier strip 28 has a lower portion thereof embedded into the slab 26 during the pouring of the latter and is subsequently positioned so as to lie adjacent the wall 27 on the inner side thereof. During the laying of the bricks or blocks 29 which form the wall 27, the other marginal edge portion of the barrier strip 28 is positioned between two adjacent bricks or blocks with the normal mortar or cement is located on either side of the marginal edge portion of the barrier strip so that when the wall is finished, the marginal edge portion is integral with the wall structure and will prevent the passage of termites.

It is to be understood that the term bricks or blocks includes building blocks of a range of materials Including natural stone, rock, concrete and the brick or block may be of steel or aluminum in block or sheet form.

As previously referred to with respect to FIG. 4, it is frequently necessary in building structures to provide conduits which project through the concrete base slab of the structure, and the opening provided in the slab for this purpose is a potential avenue for the passage of termites. In order to preclude the passage of termites, a sheet 34 of border material with a central aperture can be placed over the conduit prior to the pouring of the slab with the inner peripheral portion of the sheet clamped above the exterior of the conduit such as by a conventional hose clip as indicated at 35 in FIG. 9. During the subsequent pouring of the slab, the outer perimeter areas 33 of the sheet of termite barrier material is embedded in the concrete when poured and thereby provide an effective barrier to termites between the conduit and the slab as commonly arises in the prior art structures.

In the previous description of the practical application of the present invention, reference has been made to using adhesive cement to secure a marginal edge portion of the barrier strip to an adjacent member which may be concrete or building bricks or blocks. The nature of the adhesive cement is a mixture of conventional cement and fine sand to which there is added a proprietary cement adhesive agent, such as that marketed in Australia under the Registered Trade Mark BONDCRETE. The sand used in the adhesive cement is selected so that it is sufficiently fine that the individual particles will freely pass through the openings in the mesh of the barrier strip thereby ensuring an effective bond between the barrier strip and the adjacent structural member and to prevent the possible formation of areas which are not adhered and therefore potential passages for termites.

Figure 11:
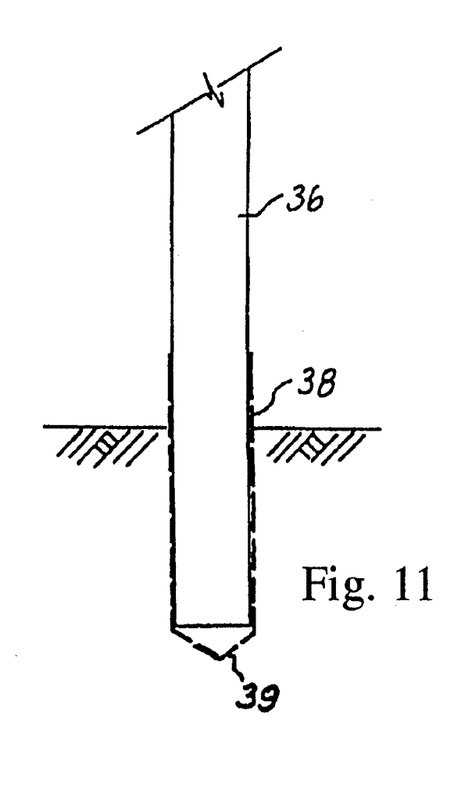
FIG. 11 is a sectional view through an upright post with the termite barrier fitted to the lower end thereof.

The termite barrier material used as above described in relation to building may also be used as a termite barrier in respect of a wide range of structures incorporating material which is subject to attack by termites. One such additional application is around the portion of a post or like member which has the lower portion thereof buried in the ground. It is customary to treat the lower portion of such posts with appropriate chemicals to inhibit attack by termites, however, such chemicals have a limited effective life and environmental disadvantages. The termite barrier material of the present invention can be formed into a sleeve or pocket 38 closed at one end 39 and fitted over the portion of the post to be buried in the ground with the closed end lowermost as shown in FIG. 11. The sleeve is of sufficient length to project at least 10 to 20 centimeters above the ground level when the post is erected.

When the barrier mesh is to be used for this purpose, it may be initially woven in a tubular form and then cut to the requisite length for each particular application. The individual lengths of the tubular mesh are then folded at the bottom end to form an effective closure. This closure may be formed by flattening a portion of the end of the tube and then forming multiple folds therein with the folded portion being subsequently pressed or hammered flat to form a multi lapped joint which is not penetrable by the termites.

When the mesh is not produced in a tubular form, a flat piece of mesh may be rolled to form a tube with the respective edges of the strip folded in a multi lapped Joint which is again rolled or hammered flat.

In the above description the application of the termite barrier material to the lower end of a post it is to be understood that the same construction of termite barrier can be used on any member which is to be buried in the ground, whether it is in the nature of or forming the function of a post or for any other purpose.

Figure 10:
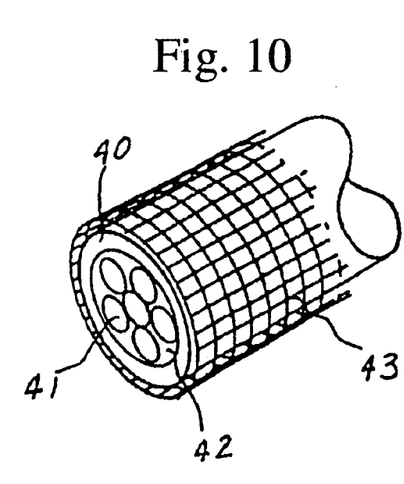
FIG. 10 is a perspective view of a cable in which the termite barrier has been incorporated.

Another use for the termite barrier material is in protecting cables, particularly underground cables which incorporate a material which is susceptible to attack by termites. Such cables normally are of a construction as shown in FIG. 10 and have an outer protective covering 40 of a suitable material in addition to the wires or other elements 41 of the cable, such as electrical or optical cable, and the normal insulation or other comings or wrappings 42 in which they are located.

It is known to weave in situ about the core of such cables fabric or wire reinforcing materials and it is proposed by the present invention that there also be woven about such cable cores a mesh of stainless steel wires or filaments 43 of the required dimensions to form a barrier against the passage of termites into the cable. If the termite barrier is not woven in situ about the core of the cable, then a wrapping of the barrier material of the required construction may be fitted about the cable with a longitudinal seam being formed by a lapped joint in the manner previously discussed. The termite barrier is located in or beneath the outer tough covering normally provided on such cables, as an alternative to about the exterior as shown in the drawing.

The termite barrier as previously described may be used in many other applications in addition to those described with reference to the accompanying drawings without departing from the present invention.

What is claimed is:

1. A termite barrier which is substantially resistant to termite chewing and corrosion the termite barrier comprising; a mesh sheet formed of a material resistant to breakdown in the environment of use and substantially resistant to termite secretions, said material having a hardness of not less than about Shore D70 for resistance to termite chewing, the mesh sheet having pores wherein each pore has a linear dimension in all directions less than the maximum linear dimension of the cross section of the head of the species of termite to be controlled.

2. The termite barrier as claimed in claim 1, wherein the pores of the mesh sheet have a linear dimension in at least one direction, less than the minimum lineal dimension of the cross section of the head of the species of termite to be controlled.

3. The termite barrier as claimed in claim 1, wherein the pores of the mesh sheet are polygonal with the maximum diagonal dimension less than the maximum linear dimension of the cross section of the head of the species of termite to be controlled.

4. The termite barrier as claimed in claim 1, wherein the pores of the mesh sheet are rectangular in shape.

5. The termite barrier as claimed in claim 4, wherein the rectangular pores each have a diagonal dimension less than 0.85 mm.

6. The termite barrier as claimed in claim 4, wherein the rectangular pores are dimensioned 0.40 mm by 0.70 mm.

7. The termite barrier as claimed in claim 1, wherein the mesh sheet is made of a corrosion resistant grade of stainless steel.

8. The termite barrier as claimed in claim 1, wherein the mesh sheet is bonded to or embedded in a moisture impervious sheet.

9. In combination with a building structure erected on a ground level concrete slab, a termite barrier which is substantially resistant to termite chewing and corrosion, the termite barrier comprising:
a mesh sheet made of a material substantially resistant to termite secretions and having a hardness of not less than about Shore D70 for resistance to termite chewing, the mesh sheet having pores wherein each pore has a linear dimension in all directions less than the maximum linear dimension of the cross-section of a head of a species of termite to be controlled, the termite barrier being positioned beneath an underside of the slab and extending to a perimeter of the slab in all directions and upwardly about the perimeter of the slab to a distance above the slab and above the ground level adjacent thereto.

10. The combinations as claimed in claim 9, further comprising a member projecting through the termite barrier and the slab, and a termite barrier sleeve integral with the termite barrier located beneath the slab and clamped in pressure engagement therewith about the perimeter of the member.

11. The combination as claimed in claim 10, wherein the sleeve is formed by cutting an opening in the termite barrier, said opening having a perimeter less than the perimeter of the member and stretching and deflecting the marginal area of termite barrier about the opening to form the sleeve.

12. A cable having a core of conductive member or members, and a protective covering surrounding the core, said covering including a termite barrier which is substantially resistant to termite chewing and corrosion, said termite barrier surrounding said core and comprising a mesh layer formed of a material substantially resistant to termite secretions and having a hardness of not less than about Shore D70 for resistance to termite chewing, the mesh sheet having pores wherein each pore has a linear dimension in all directions less than the maximum linear dimension of the cross-section of a head of a species of termite to be controlled.

13. In combination, a foundation structure for supporting a building, a termite barrier which is substantially resistant to termite chewing and corrosion for shielding the foundation structure to protect the building from termite invasion, the termite barrier comprising a mesh sheet formed of a material resistant to termite secretions and having a hardness of not less than about Shore D70 for resistance to termite chewing, the mesh sheet having pores wherein each pore has a linear dimension in all directions less than the maximum linear dimension of the cross-section of a head of a species of termite to be controlled, the termite barrier covering the foundation structure to protect the building supported thereon against termites.

14. In combination with a building structure erected on a ground level or near ground level concrete slab, and having a non integral termite resistant adjacent structure, a strip of termite barrier material which is substantially resistant to termite chewing or corrosion, the termite barrier comprising; a mesh sheet made of a material substantially resistant to termite secretions and having a hardness of not less than about Shore D70 for resistance to termite chewing, the mesh sheet having pores wherein each pore has a linear dimension in all directions less than the maximum linear dimension of the cross section of a head of a species of termite to be controlled, said strip of termite barrier material having respective marginal edge portions along opposite longitudinal edges of the strip integrally secured to the slab and the adjacent structure to establish integrity of the connection between the slab and the adjacent structure against the passage of termites.

15. The combination as claimed in claim 14, wherein the adjacent structure is a further concrete structure.

16. The combination as claimed in claim 14, wherein the adjacent structure is composed substantially of a building material selected from the group consisting of brick, natural stone, rock, concrete block, steel and aluminum in block or sheet form.

17. The combination claimed in claim 14, wherein the slab and the adjacent structure are each cat in-situ concrete components, the respective marginal edge portions of the termite barrier strip being embedded into the slab and adjacent structure during the pouring of the concrete.

18. The combination claimed in claim 14, wherein the slab and adjacent structure are each preformed and the combination further comprises an adhesive resistant to attack by termites for bonding the marginal edge portions of the strip of termite barrier material to the slab and adjacent structures.

19. The combination claimed in claim 18, further comprising a mechanical fastener for additionally securing the respective marginal edge portions of the termite barrier strip at spaced intervals along the length thereof.

20. A post or column to be erected with an end portion thereof embedded in the ground, said end portion being enclosed in a protective sleeve closed at one end, said sleeve being made from a mesh sheet of a material substantially resistant to termite secretions and having a hardness of not less than about Shore D70 for resistance to termite chewing, the mesh sheet having pores wherein each pore has a linear dimension in all directions less than the maximum linear dimension of the cross section of a head of a species of termite to be controlled.

* * * * *

UNITED STATES PATENT AND TRADEMARK OFFICE
CERTIFICATE OF CORRECTION

PATENT NO. : 5,417,017

DATED : MAY 23, 1995

INVENTOR(S) : VASILIOS TOUTOUNTZIS

It is certified that error appears in the above-indentified patent and that said Letters Patent is hereby corrected as shown below:

Col. 1, line 19, delete "year", and insert therefore --years--

Col. 1, line 27, delete "11 412/83", and insert therefore --11412/83--

Col. 1, line 33, delete "chemical", and insert therefore --chemicals--

Col. 1, line 34, delete "carded", and insert therefore --carried--

Col. 1, line 53, delete "important", and insert therefore --importantly--

Col. 1, line 54, delete "is", and insert therefore --are--

Col. 1, line 57, delete "dyers", and insert therefore --rivers--

Col. 2, line 27, delete "joint", and insert therefore --join--

Col. 3, line 13, delete "the termites", and insert therefore --their--

Col. 3, line 29, delete "provide", and insert therefore --provides--

Col. 3, line 65, delete "tach", and insert therefore --attack--

UNITED STATES PATENT AND TRADEMARK OFFICE
CERTIFICATE OF CORRECTION

PATENT NO. : 5,417,017

DATED : MAY 23, 1995

INVENTOR(S) : VASILIOS TOUTOUNTZIS

It is certified that error appears in the above-indentified patent and that said Letters Patent is hereby corrected as shown below:

Col. 4, line 12, after "particular", insert --termite--

Col. 4, line 18, after "flattened", insert --shape--

Col. 4, line 19, delete "shape"

Col. 4, line 41, delete "inhibit", and insert therefore --inhibiting--

Col. 4, line 56, delete "is", and insert therefore --are--

Col. 5, line 14, delete "2b.", and insert therefore --2b;--

Col. 5, line 63, delete "base 23", and insert therefore --base 23.--

Col. 6, line 55, delete "30°", and insert therefore --30--

Col. 7, line 15, delete "through,", and insert therefore --through.--

Col. 7, lines 35 and 36, delete "trans-portion", and insert therefore --trans-portation--

UNITED STATES PATENT AND TRADEMARK OFFICE
CERTIFICATE OF CORRECTION

PATENT NO. : 5,417,017
DATED : MAY 23, 1995
INVENTOR(S) : VASILIOS TOUTOUNTZIS

Page 3 of 3

It is certified that error appears in the above-indentified patent and that said Letters Patent is hereby corrected as shown below:

Col. 8, line 2, delete "case", and insert therefore --cast--

Col. 8, line 45, delete "of", and insert therefore --or--

Col. 9, line 7, delete "Including", and insert therefore --including--

Col. 9, line 17, after "conduit", insert --31--

Col. 10, line 21, delete "comings", and insert therefore --coatings--

Please replace FIG. 4 of the drawings with the drawing of FIG. 4 attached.

Figure 9:
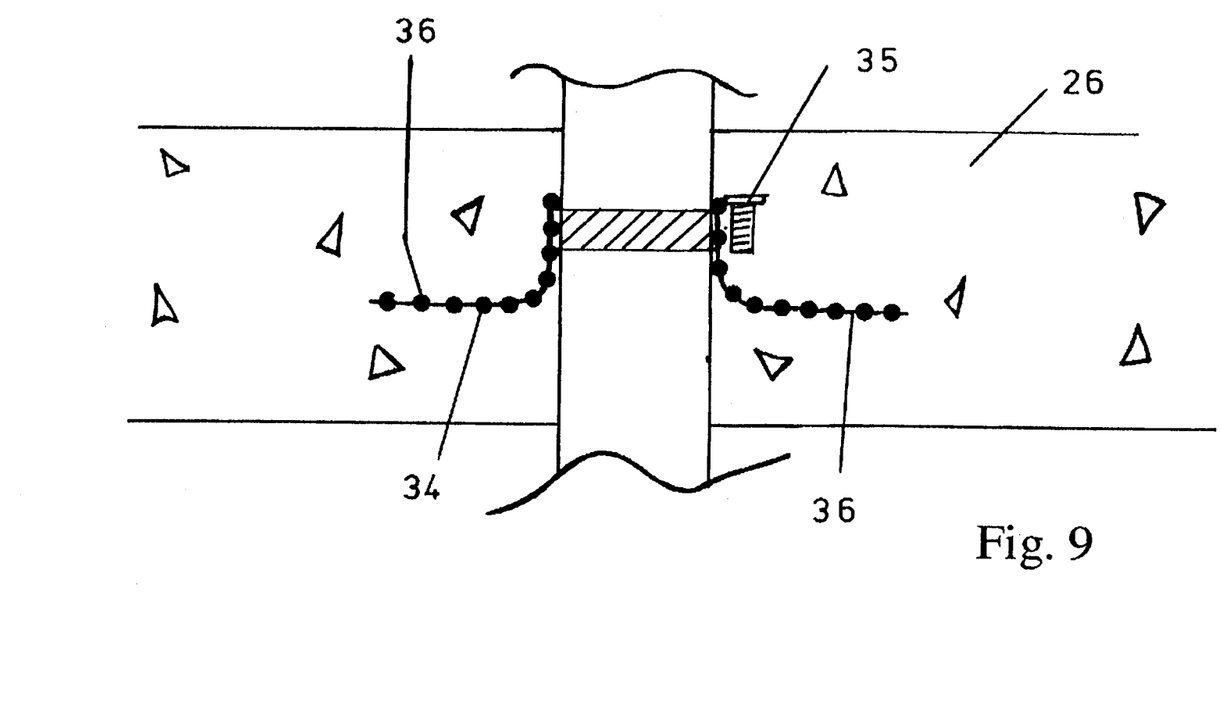
FIG. 9 is a cross sectional view of portion of a building slab through which a conduit extends and having a termite barrier fitted thereto in an alternative manner to that shown in FIG. 4.

Please replace FIG. 9 of the drawings with the drawing of FIG. 9 attached.

Signed and Sealed this

Twelfth Day of August, 1997

Attest:

Attesting Officer

BRUCE LEHMAN

Commissioner of Patents and Trademarks